(12) United States Patent
Saito et al.

(10) Patent No.: US 10,525,645 B2
(45) Date of Patent: Jan. 7, 2020

(54) METHOD FOR MANUFACTURING FUNCTIONAL PLASTIC LENS AND POLARIZING PLASTIC LENS

(71) Applicant: HOYA LENS THAILAND LTD., Patumthani (TH)

(72) Inventors: Kiyohiro Saito, Tokyo (JP); Takashi Suzuki, Tokyo (JP); Kiyonori Sato, Tokyo (JP); Kenji Tanagawa, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 55 days.

(21) Appl. No.: 15/557,928

(22) PCT Filed: Mar. 31, 2016

(86) PCT No.: PCT/JP2016/001868
§ 371 (c)(1),
(2) Date: Sep. 13, 2017

(87) PCT Pub. No.: WO2016/157909
PCT Pub. Date: Jun. 10, 2016

(65) Prior Publication Data
US 2018/0043645 A1    Feb. 15, 2018

(30) Foreign Application Priority Data

Mar. 31, 2015  (JP) ................................. 2015-070956
Mar. 31, 2015  (JP) ................................. 2015-070957

(51) Int. Cl.
*B29D 11/00* (2006.01)
*B29C 45/56* (2006.01)
(Continued)

(52) U.S. Cl.
CPC .. *B29D 11/00644* (2013.01); *B29C 45/14065* (2013.01); *B29C 45/56* (2013.01);
(Continued)

(58) Field of Classification Search
CPC ........ B29D 11/00644; B29D 11/00009; B29C 45/56; B29C 45/14065
See application file for complete search history.

(56) References Cited

U.S. PATENT DOCUMENTS 6,165,392 A     12/2000  Kobuchi et al.
2006/0028613 A1   2/2006  Yasuda

FOREIGN PATENT DOCUMENTS

JP    S56-13139 A    2/1981
JP    S61-56090 B2   12/1986
(Continued)

OTHER PUBLICATIONS

Jul. 5, 2016 International Search Report issued in International Patent Application No. PCT/JP2016/001868.
(Continued)

*Primary Examiner* — Mathieu D Vargot
(74) *Attorney, Agent, or Firm* — Oliff PLC

(57) ABSTRACT

In manufacturing a functional plastic lens by loading a functional sheet S having a difference in the accuracy of bending in directions, into a mold 50 and by performing insert molding to integrally mold a lens body with the functional sheet S, a direction in which the accuracy of the bending to the functional sheet S is high is made to be a reference axis A, and the functional sheet S is loaded into the mold 50 to inhibit a filling direction of resin and the reference axis A from being orthogonal to each other. With this arrangement, the functional plastic lens having high quality is provided.

4 Claims, 7 Drawing Sheets

(51) Int. Cl.
   *G02B 3/00* (2006.01)
   *G02B 5/30* (2006.01)
   *G02C 7/02* (2006.01)
   *G02C 7/12* (2006.01)
   *B29C 45/14* (2006.01)
   *G02B 1/08* (2006.01)
   *B29K 33/00* (2006.01)
   *B29K 69/00* (2006.01)
   *B29L 11/00* (2006.01)

(52) U.S. Cl.
   CPC .......... *B29D 11/00009* (2013.01); *G02B 1/08* (2013.01); *G02B 3/00* (2013.01); *G02B 5/30* (2013.01); *G02C 7/02* (2013.01); *G02C 7/12* (2013.01); *B29K 2033/08* (2013.01); *B29K 2069/00* (2013.01); *B29K 2995/0034* (2013.01); *B29L 2011/0016* (2013.01)

(56) References Cited

FOREIGN PATENT DOCUMENTS

| | | |
|---|---|---|
| JP | H11-245259 A | 9/1999 |
| JP | 2006-047586 A | 2/2006 |

OTHER PUBLICATIONS

Jul. 5, 2016 Written Opinion issued in International Patent Application No. PCT/JP2016/001868.

ately acts in the filling direction.">
METHOD FOR MANUFACTURING FUNCTIONAL PLASTIC LENS AND POLARIZING PLASTIC LENS

TECHNICAL FIELD

The present invention relates to a method of manufacturing a functional plastic lens having high quality, and a polarizing plastic lens.

BACKGROUND ART

Conventionally, spectacle plastic lenses are, in some cases, manufactured by an injection molding process with thermoplastic resin, such as polycarbonate resin or methacrylate resin. According to the injection molding process, transferring the cavity shape of a mold can mold even a plastic lens having a complicated optical surface shape, such as a progressive power lens, with high precision.

In manufacturing a functional lens, such as a polarizing lens, by the injection molding process, it has been known that insert molding is performed with a functional sheet, such as a polarizing sheet, loaded into a mold in accordance with a desired function, (e.g., refer to Patent Literature 1).

CITATION LIST

Patent Literature

Patent Literature 1: JP 2006-47586 A

SUMMARY OF INVENTION

Technical Problem

In Patent Literature 1, bending is performed to a polarizing sheet in accordance with the surface curved shape of a powered polarizing plastic lens to be manufactured, and then the powered polarizing plastic lens having an aspherical surface is manufactured.

However, an aspherical surface agreeing with a lens shape with the distortion of a curved surface being inhibited, is difficult to form with a polarizing sheet to which bending has been performed. Accordingly, in Patent Literature 1, performing first-bending to the polarizing sheet molds an intermediate processed product having a curved surface smaller than that of a completed product in curvature. Then, performing second-bending to the intermediate processed product forms the completed product having a predetermined aspherical curved surface, and thus the incremental bending inhibits the polarizing sheet from being added with unnecessary force.

Meanwhile, it is also considered that bending is performed to the polarizing sheet to have a curved surface approximate to a molding surface and then the polarizing sheet is deformed to agree with the molding surface due to the heat and the filling pressure of resin in injection molding. In this manner, deforming the polarizing sheet to be integrally molded with a lens body, also can manufacture the polarizing plastic lens having a desired optical surface shape.

However, according to the consideration of the present inventors, the following knowledge is acquired in manufacturing the polarizing plastic lens in this manner. That is, when the curve of the polarizing sheet to which the bending has been performed is larger and deeper than the curvature of the molding surface, "wrinkles" being an external appearance defect easily occur on a lens surface that has been manufactured. Particularly, the "wrinkles" easily occur at a position close to the opposite gate side from the center side of the lens surface.

The present invention has been made in consideration of the knowledge. An object of one embodiment of the present invention is to provide a method of manufacturing a functional plastic lens with wrinkles of a lens surface inhibited from occurring, and a polarizing plastic lens, in manufacturing the functional plastic lens by insert molding with a functional sheet corresponding to a desired function, such as a polarizing sheet, loaded into a mold.

Solution to Problem

The following reason is considered to cause the above defect.

The polarizing sheet is deformed to agree with the molding surface, extending slightly in a flowing direction of molten resin that has been injected. In this case, if the curve of the polarizing sheet is deeper than the molding surface, the center side of the polarizing sheet comes in contact with the molding surface when loaded into the mold. Accordingly, it is considered that the polarizing sheet is prevented from extending while adhering to the molding surface from the center side toward the outer circumferential side and then the "wrinkles" occurs in a portion that does not extend anymore. In this case, a force that extends the polarizing sheet acts in a direction orthogonal to a filling direction of the resin, but considerably acts in the filling direction. Accordingly, it is considered that the "wrinkles" easily occur at the position close to the opposite gate side from the center side on the lens surface.

As a result of serious consideration, the present inventors have acquired knowledge that, in performing bending to the polarizing sheet as the functional sheet, there is a difference in the accuracy of the bending between a direction parallel to the polarizing axis of the polarizing sheet and a direction orthogonal to the polarizing axis.

For example, as also disclosed in Patent Literature 1, in order to perform the bending to the polarizing sheet, a mold formed to have a desired curved surface, is prepared, and then the polarizing sheet is pressed to the mold being applied with heat to perform the bending. In this case, there is a tendency that the bending can be performed to acquire an approximate on-target curve in the direction parallel to the polarizing axis. In contrast to this, there is a tendency that the curve bends to be shallow on the center side and to be deep on the outer circumferential side in the direction orthogonal to the polarizing axis. According to the serious consideration of the present inventors, the knowledge that the polarizing sheet has the tendencies has been acquired.

Typically, spectacle lenses are molded to be circular so that the spectacle lenses can apply to spectacle frames having various shapes. Each is appropriately cut out in accordance with the shape of the spectacle frame into which the lens is inserted. Accordingly, portions protruding from the upper and lower sides of the spectacle frame are often cut and discarded. Therefore, in order to mold a spectacle plastic lens by an injection molding process, a mold is designed to arrange a gate at a position to be on the upper side or the lower side in cutting out in accordance with the shape of the spectacle frame. Thus, the polarizing lens is inserted into the spectacle frame to make the polarizing axis horizontal.

Accordingly, in order to mold the polarizing plastic lens by insert molding with the polarizing sheet loaded into the mold designed as described above, the polarizing sheet is loaded into the mold to make the polarizing axis orthogonal to the filling direction of the resin. As a result, the filling direction of the resin agrees with the direction orthogonal to the polarizing axis having the tendency that the accuracy of the bending is low and the curve bends to be shallow on the center side and to be deep on the outer circumferential side. The present inventors have found that this causes the occurrence of the "wrinkles", and have completed the present invention.

That is, a method of manufacturing a functional plastic lens according to one embodiment of the present invention, in manufacturing the functional plastic lens by loading a functional sheet having a difference in accuracy of bending in directions, into a mold and by performing insert molding to integrally mold a lens body with the functional sheet, includes: making a direction in which the accuracy of the bending to the functional sheet is high, a reference axis; and the loading the functional sheet into the mold to inhibit a filling direction of resin and the reference axis from being orthogonal to each other. A polarizing plastic lens being the functional plastic lens molded by the insert molding includes the polarizing axis of a polarizing sheet not orthogonal to a direction facing the center of a gate mark through the center of the lens.

Advantageous Effects of Invention

According to the one embodiment described above, the functional plastic lens with wrinkles of a lens surface inhibited from occurring can be manufactured in manufacturing the functional plastic lens by the insert molding with the functional sheet loaded into the mold.

The polarizing plastic lens as the functional plastic lens molded by the insert molding in this manner is a polarizing plastic lens having high quality with wrinkles of a lens surface inhibited from occurring.

DESCRIPTION OF EMBODIMENTS

One preferred embodiment of the present invention will be described in detail below with reference to the drawings. Note that, the same portions or similar portions in the figures are denoted with the same reference signs, and thus the descriptions thereof will be omitted.

[Injection Molding Device]

Figure 1:
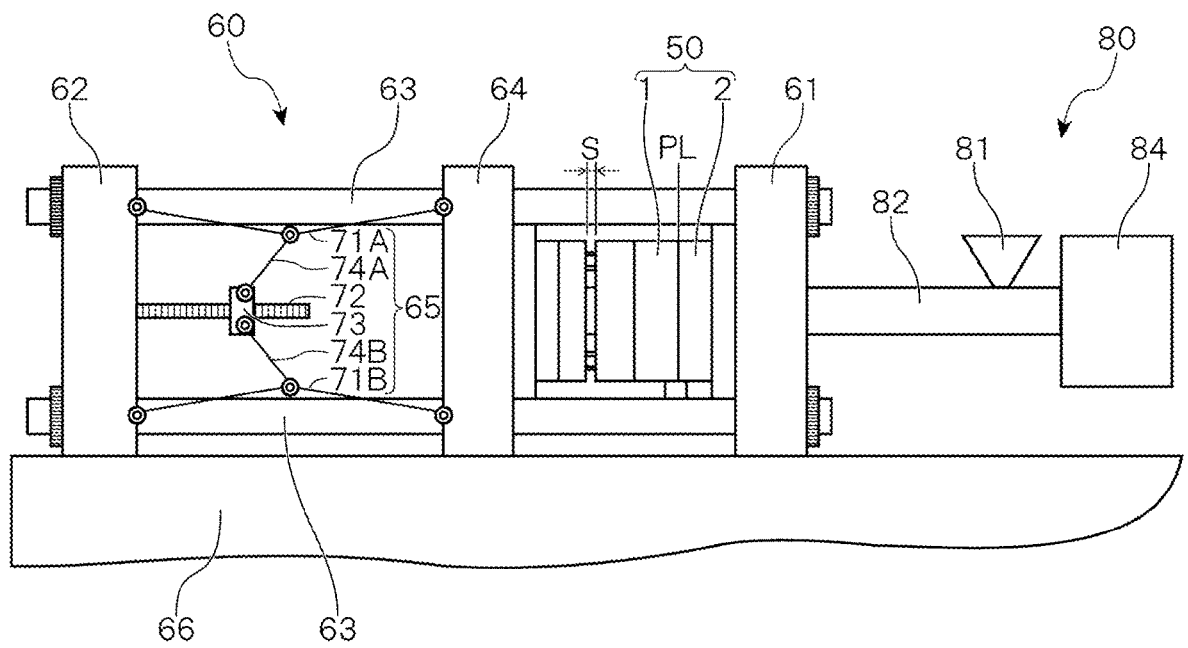
FIG. 1 is an explanatory view of an exemplary injection molding device.

FIG. 1 is an explanatory view of an exemplary injection molding device, and the injection molding device is preferably used so that a method of manufacturing a functional plastic lens according to the present embodiment can be performed.

The injection molding device illustrated in FIG. 1 includes a mold 50, a mold clamper 60, and an injection device 80. The mold 50 includes a movable mold 1 and a fixed mold 2 being a pair of dividing molds divided at a parting line PL. The mold clamper 60 performs opening/closing and mold-clamping of the mold 50, with a toggle link mechanism 65. The injection device 80 uses a heating cylinder 82 to melt, mix, and measure raw resin input from a hopper 81, and then injects the raw resin from a nozzle 85.

Figure 2:
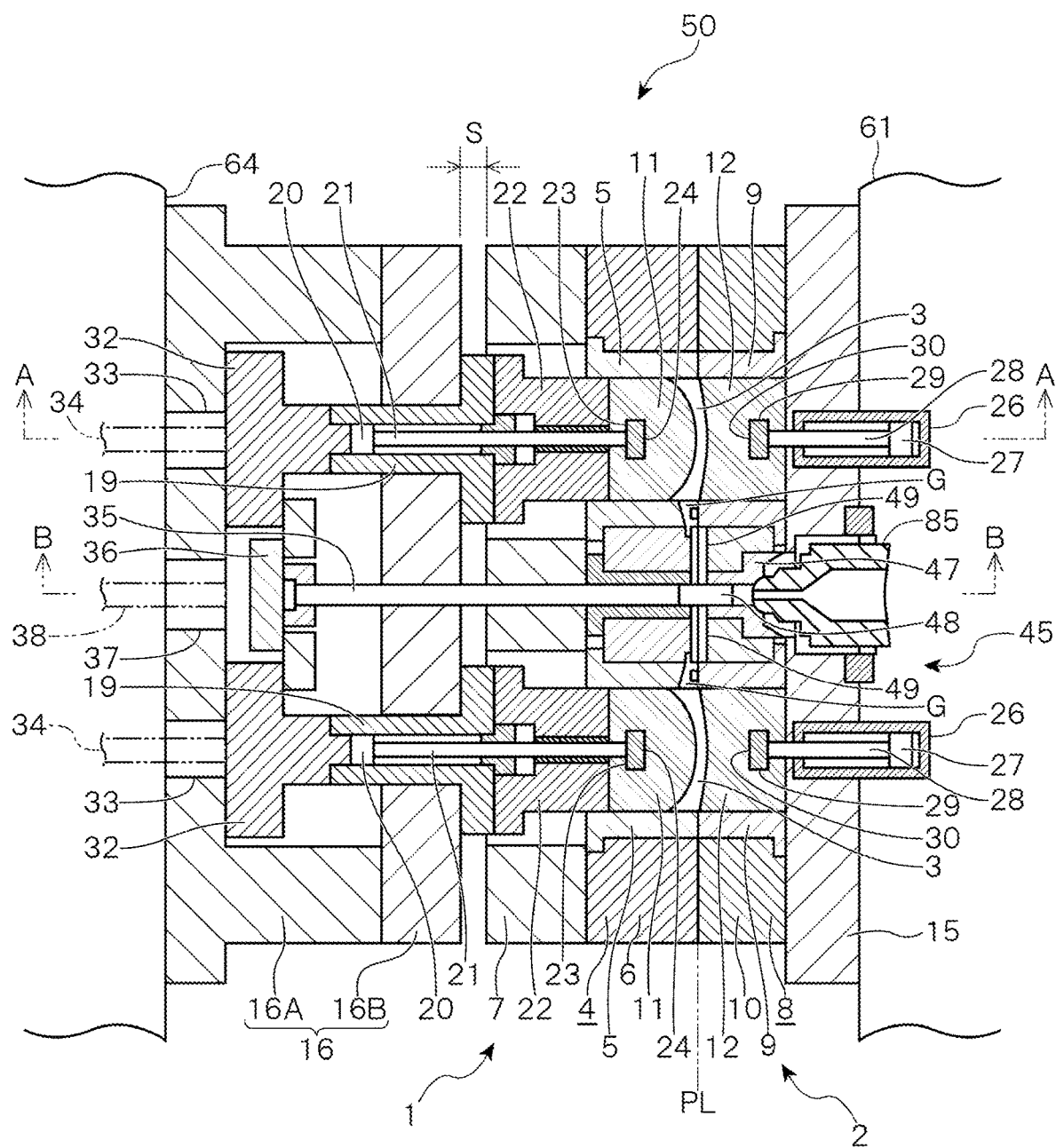
FIG. 2 is a schematic sectional view of a mold included in the injection molding device illustrated in FIG. 1.

Note that, FIG. 2 illustrates a schematic sectional view of the mold 50 included in the injection molding device illustrated in FIG. 1.

[Injection Device]

The injection device 80 included in the injection molding device illustrated in FIG. 1, includes the heating cylinder 82 including the nozzle 85 formed at a tip portion. A screw controlled to rotate and move forward and backward by a drive unit 84, is provided inside the heating cylinder 82.

The hopper 81 that inputs the raw resin being pellet-shaped into the heating cylinder 82 is coupled to the base end side of the heating cylinder 82. The raw resin input from the hopper 81 into the heating cylinder 82, is sheared and pulverized by the screw rotating inside the heating cylinder 82. Then, the raw resin is sent to a cylinder anterior chamber formed between the tip of the screw and the nozzle 85, so as to be measured, the raw resin being melted and mixed by shear heat and heating from a heater included in the heating cylinder 82. After that, the nozzle 85 injects a predetermined amount of the raw resin that has been adjusted to have viscosity suitable for the injection molding and has been molten.

[Mold Clamper]

In the injection molding device illustrated in FIG. 1, the mold clamper 60 includes a plurality of tie bars 63 disposed between a fixed die plate 61 and a rear plate 62 erected at a predetermined interval on a stand 66. The mold clamper 60 includes a movable die plate 64 movable due to the guide of the tie bars 63. The mold 50 is mounted between the movable die plate 64 and the fixed die plate 61, and the toggle link mechanism 65 is mounted between the movable die plate 64 and the rear plate 62.

With this arrangement, when the toggle link mechanism 65 drives, the movable die plate 64 moves backward due to the guide of the tie bars 63 so that the opening/closing and the mold-clamping of the mold 50 are performed.

Here, the toggle link mechanism 65 moves a crosshead 73 that has been screwed, along a ball screw 72, in accordance with rotation of the ball screw 72 coupled to a motor not illustrated. When the crosshead 73 moves to the side of the movable die plate 64, a toggle link 71 linearly extends due to a coupling link 74. Accordingly, the movable die plate 64 moves (forward) to be close to the fixed die plate 61. Conversely, when the crosshead 73 moves to the side of the rear plate 62, the toggle link 71 bends inward due to the coupling link 74. Accordingly, the movable die plate 64 moves (backward) to be away from the fixed die plate 61.

[Mold]

Figure 3:
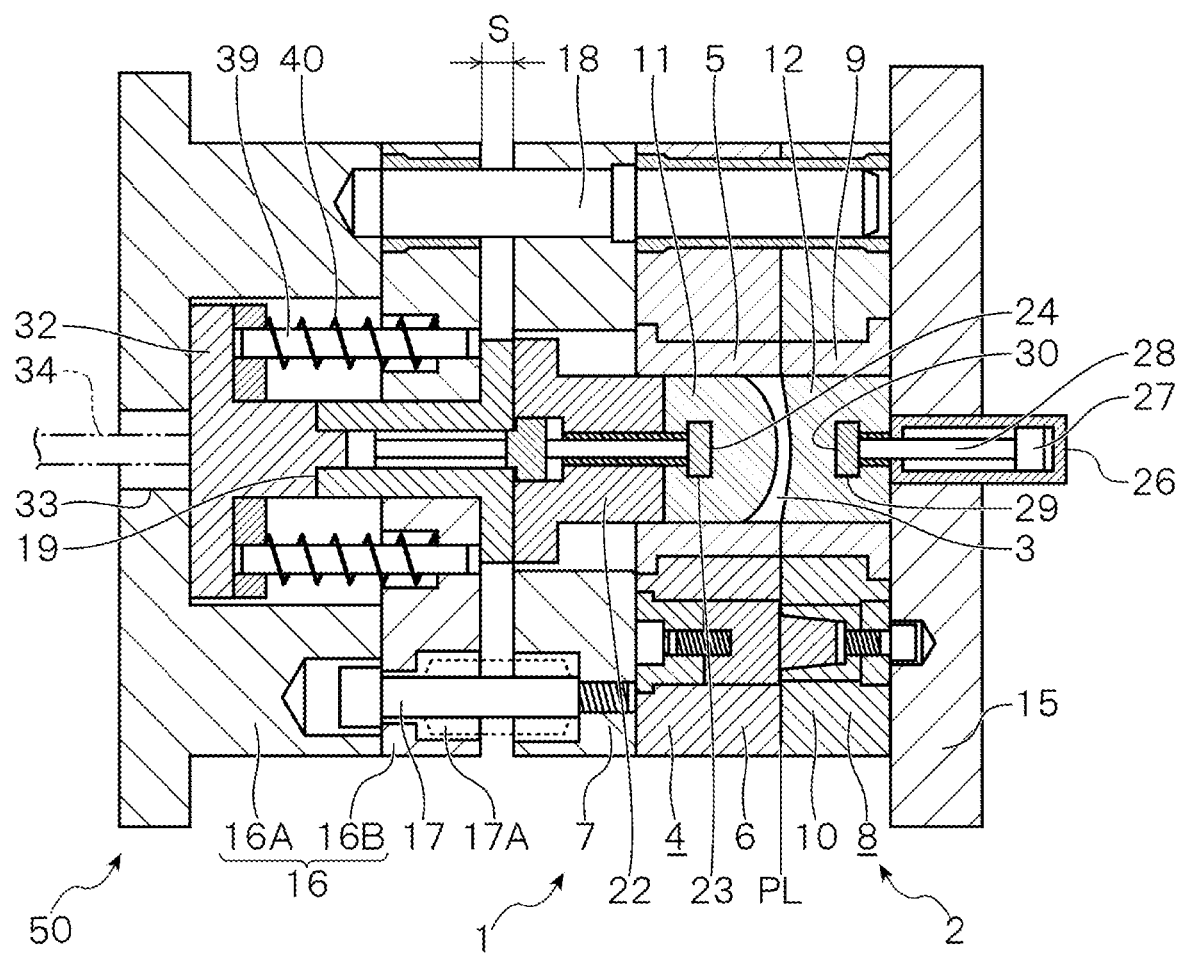
FIG. 3 is a sectional view taken from line A-A of FIG. 2.
Figure 4:
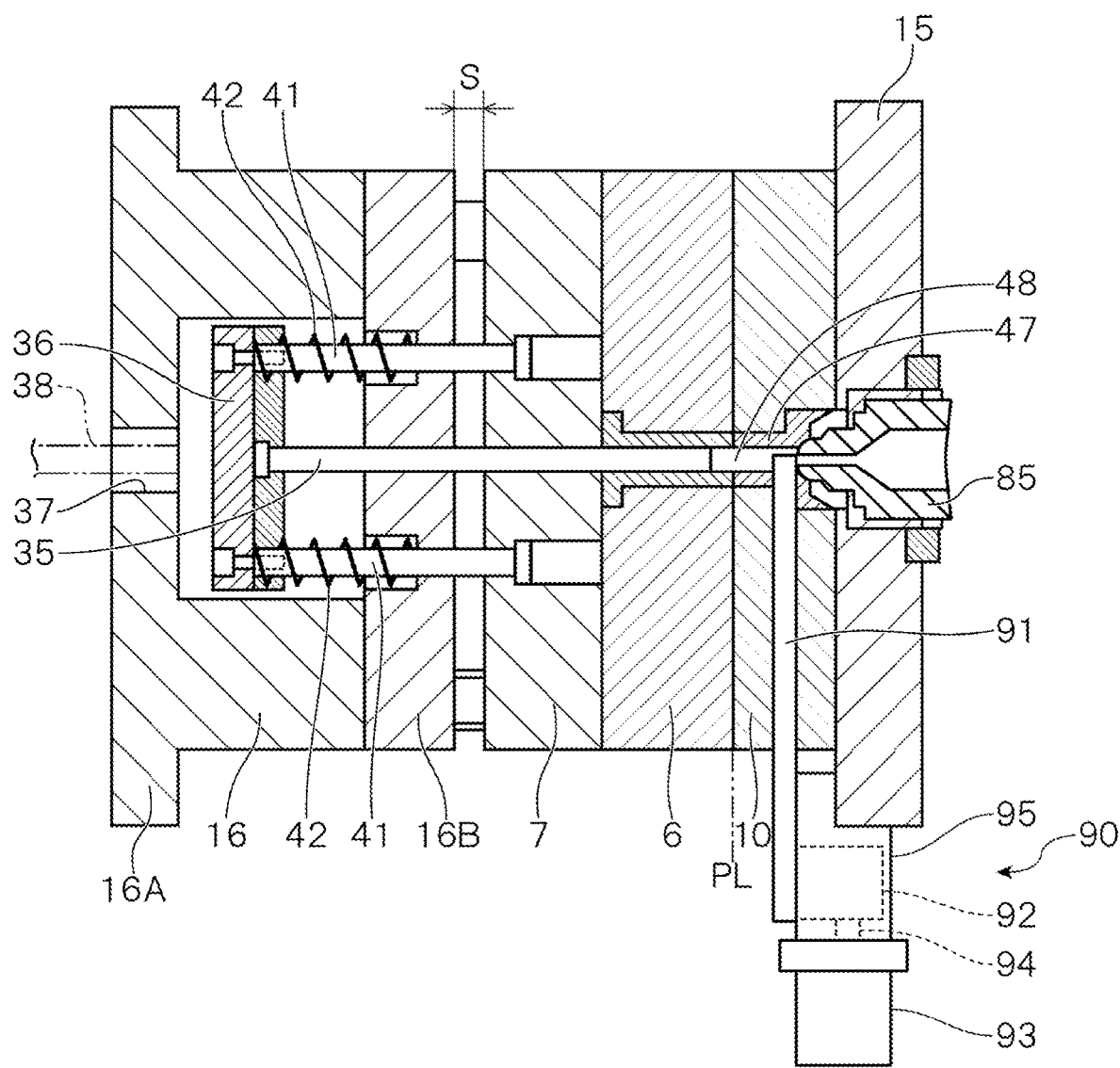
FIG. 4 is a sectional view taken from line B-B of FIG. 2.

FIG. 2 is the schematic sectional view of the mold 50 used in the present embodiment. FIG. 2 corresponds to a sectional view illustrating a section taken from the mold 50 illustrated in FIG. 1, by a plane perpendicular to a sheet passing through the center axis of the mold 50, and illustrates an initial state where mold-closing has been performed. FIG. 3 is a sectional view taken from line A-A of FIG. 2, and FIG. 4 is a sectional view taken from line B-B of FIG. 2.

In an example illustrated in the figures, a mold body 4 of the movable mold 1 is fixed to the movable die plate 64 through a mold mounting member 16. Meanwhile, a mold body 8 of the fixed mold 2 is fixed to the fixed die plate 61 through a mold mounting member 15. With this arrangement, the mold 50 is mounted between the fixed die plate 61 and the movable die plate 64 in the mold clamper 60.

The mold body 4 of the movable mold 1 includes two insert guide members 5 and templates 6 and 7 retaining the two insert guide members 5. An insert 11 is housed to be slidable in a direction perpendicular to the parting line PL, inside each of the insert guide members 5. The insert 11 includes a molding surface formed, the molding surface corresponding to one surface of a plastic lens to be molded (a surface on the side of a recess surface in the illustrated example).

The mold body 8 of the fixed mold 2 includes two insert guide members 9 and a template 10, and the template 10 and the mold mounting member 15 retains the insert guide members 9. An insert 12 is housed to be slidable in the direction perpendicular to the parting line PL, inside each of the insert guide members 9. The insert 12 includes a molding surface formed, the molding surface corresponding to the other surface of the plastic lens to be molded (a surface on the side of a protruding surface in the illustrated example).

The mold 50 including the movable mold 1 and the fixed mold 2, includes cavities 3 formed between the movable mold 1 and the fixed mold 2, the cavities 3 each including the molding surface formed on the insert 11 on the side of the movable mold 1 and the molding surface formed on the insert 12 on the side of the fixed mold 2.

Note that, the two cavities 3 each for molding the plastic lens having a predetermined shape, and a runner 49 being a resin channel coupled to each of the cavities 3 through a gate G, are formed between the movable mold 1 and the fixed mold 2. The template 10 of the fixed mold 2 includes a sprue bush 47 mounted, the sprue bush 47 forming a sprue 48 perpendicularly coupled to the runner 49.

The mold mounting member 16 on the side of the movable mold 1 includes hydraulic cylinders 19 provided, the hydraulic cylinders 19 individually corresponding to the inserts 11. In addition, a piston rod 21 coupled to a piston 20, passes through a back insert 22 fixed on the side of one end of each of the hydraulic cylinders 19. A T-shaped clamp member 23 provided to the tip of the piston rod 21 engages with a T-shaped groove 24 formed on the back of the insert 11 (a surface on the side opposite to the surface including the molding surface formed), so as to be engageable and disengageable.

With this arrangement, the insert 11 can be exchanged in accordance with the plastic lens to be molded. That is, in a state where mold-releasing has been performed to the mold 50, the piston rod 21 of each of the hydraulic cylinders 19 moves forward and the T-shaped clamp member 23 provided to the tip of the piston rod 21 protrudes from the insert guide member 5 so that the insert 11 can be exchanged. When the piston rod 21 of each of the hydraulic cylinders 19 moves backward, the insert 11 mounted on the T-shaped clamp member 23 is housed inside the insert guide member 5.

Similarly, the mold mounting member 15 on the side of the fixed mold 2 includes hydraulic cylinders 26 provided, the hydraulic cylinders 26 individually corresponding to the inserts 12. In addition, a piston rod 28 coupled to a piston 27, passes through the mold mounting member 15. A T-shaped clamp member 29 provided to the tip of the piston rod 28 engages with a T-shaped groove 30 formed on the back of the insert 12 (a surface on the side opposite to the surface including the molding surface formed), so as to be engageable and disengageable.

With this arrangement, the insert 12 can be exchanged in accordance with the plastic lens to be molded. That is, in a state where the mold-releasing has been performed to the mold 50, the piston rod 28 of each of the hydraulic cylinders 26 moves forward and the T-shaped clamp member 29 provided to the tip of the piston rod 28 protrudes from the insert guide member 9 so that the insert 12 can be exchanged. When the piston rod 28 of each of the hydraulic cylinders 26 moves backward, the insert 12 mounted on the T-shaped clamp member 29 is housed inside the insert guide member 9.

In fixing the mold body 4 of the movable mold 1 to the movable die plate 64, the mold body 4 is mounted on the mold mounting member 16 including a first member 16A and a second member 16B, with a bolt 17 (refer to FIG. 3). In this case, a plurality of disc springs 17A inserted on the outer circumference of the bolt 17 is interposed between the mold body 4 of the movable mold 1 and the mold mounting member 16. With this arrangement, a gap S is formed between the mold body 4 of the movable mold 1 and the mold mounting member 16.

The movable die plate 64 further moves forward after the mold 50 closes, to press the mold mounting member 16 guided by a guide pin 18 against the elastic force of the disc springs 17A so that the gap S closes. Accordingly, each of the hydraulic cylinders 19 provided to the mold mounting member 16 presses the insert 11 through the back insert 22, in the illustrated example. With this arrangement, each of the cavities 3 can vary in capacity in performing the mold-clamping so that the insert 11 can pressurize and compresses molten resin injected and filled into the cavity 3.

Note that, the guide pin 18 protrudes to the side of the fixed mold 2 so as to be inserted through a through-hole drilled in the fixed mold 2 in order to guide the opening/closing operation of the mold 50.

A pressure-receiving member 32 is mounted on the side of the other end of each of the hydraulic cylinders 19 provided to the mold mounting member 16 on the side of the movable mold 1. When an ejecting rod 34 inserted from a hole 33 formed through the mold mounting member 16, presses the pressure-receiving member 32, the hydraulic cylinder 19, the back insert 22, and the insert 11 are also pressed. With this arrangement, the lens molded in each of the cavities 3 is pressed out.

In addition, an ejecting pin 35 is arranged to be movable forward and backward in parallel to the opening/closing direction of the mold 50, at the center of the mold mounting member 16. When an ejecting rod 38 inserted from a hole 37 formed through the mold mounting member 16, presses a pressure-receiving member 36 mounted on the ejecting pin 35, the ejecting pin 35 is pressed out.

Therefore, in performing the mold-releasing, the ejecting rods 34 and 38 move forward so that a molded product is ejected.

Note that, as illustrated in FIG. 4, the spring force of a spring 42 wound on the outer circumference of an ejecting return pin 41, acts leftward in the figure with respect to the pressure-receiving member 36. As not particularly illustrated, a similar structure of allowing spring force to act leftward in the figure with respect to the pressure-receiving member 32 is provided. With this arrangement, when the ejecting rods 34 and 38 move backward, the pressure-receiving members 32 and 36 also move backward to return to a standby position.

As illustrated in FIG. 4, the mold 50 includes a nozzle shutting mechanism 90 that shuts the nozzle 85 in the injection device 80. The nozzle shutting mechanism 90 includes a nozzle shutting pin 91 as an interrupting member that protrudes into the sprue 48 formed with the sprue bush 47. The nozzle shutting pin 91 is coupled to a piston rod 94 in a hydraulic cylinder 93 through a coupling piece 92. A cylinder mounting plate 95 fixes the hydraulic cylinder 93 to the mold mounting member 15. With this arrangement, when the hydraulic cylinder 93 drives in a state where the nozzle 85 has pressed in contact with the sprue bush 47, the nozzle shutting pin 91 protrudes into the sprue 48 to shut the nozzle 85 so that backflow of the resin is prevented.

[Method of Manufacturing Functional Plastic Lens]

According to the present embodiment, insert molding is performed by the injection molding device to mold a lens body integrally with a polarizing sheet S as a functional sheet loaded into the mold 50 so that a functional plastic lens is manufactured.

Note that, according to the present embodiment, an exemplary polarizing plastic lens molded with the polarizing sheet (the functional sheet) S by the insert molding, will be described as the functional plastic lens, but the present embodiment is not limited to this. In loading the functional sheet S corresponding to a desired function, such as photochromatic function, an antireflection function, a shading function, a UV blocking function, or a shot-wavelength light blocking function, into the mold and molding the functional plastic lens by the insert molding, the insert molding is similarly performed so that the functional plastic lens having high quality can be manufactured even in a case where the functional sheet S has a difference in the accuracy of bending in directions.

The polarizing plastic lens (the functional plastic lens) given with a polarizing function, is typically manufactured to integrally form the polarizing sheet S being the functional sheet with a lens surface. Accordingly, in the present embodiment, the polarizing sheet S to which bending is performed in accordance with the molding surface formed on each of the inserts 12 on the side of the fixed mold 2, is prepared, the polarizing sheet S being cut out on the basis of the outer shape of the molding surface. Then, the polarizing sheet S is loaded to the side of the fixed mold 2 of the mold 50, but the present embodiment is not limited to this.

In performing the bending to the polarizing sheet S, there is a difference in the accuracy of the bending between a direction parallel to the polarizing axis of the polarizing sheet S and a direction orthogonal to the polarizing axis. There is a tendency that the bending can be performed to acquire an approximate on-target curve in the direction parallel to the polarizing axis, whereas there is a tendency that the curve bends to be shallow on the center side and to be deep on the outer circumferential side in the direction orthogonal to the polarizing axis, as described above.

According to the present embodiment, in consideration of the bending characteristic of the polarizing sheet S, a direction in which the accuracy of the bending is high (namely, the direction parallel to the polarizing axis) is made to be a reference axis A, and the polarizing sheet S is loaded into the mold 50 to inhibit the filling direction of the resin and the polarizing axis of the polarizing sheet S from being orthogonal to each other.

For example, the polarizing sheet S is loaded into the mold 50 to make the slant of the reference axis A preferably at 45° or less, more preferably at 30° or less, further preferably at 20° or less, particularly preferably at 10° or less, and most preferably at 5° or less, to the filling direction of the resin. With this arrangement, the resin is filled in the direction in which the bending has been performed with high precision. As a result, "wrinkles" being an external appearance defect is favorably inhibited from occurring on the lens surface that has been manufactured, so that the functional plastic lens having the high quality can be manufactured.

Note that, in a case where the polarizing sheet S is used as the functional sheet, the reference axis A agrees with the polarizing axis of the polarizing sheet S.

Here, the filling direction of the resin agrees with a direction in which the molten resin that has been injected, is filled into each of the cavities 3 through the gate G. More specifically, the filling direction of the resin agrees with a direction in which the center line of the runner 49 in proximity to the gate G, extends from the side of the gate G to the opposite gate side, and the direction is indicated with a dot-and-dash line in FIG. 5.

Figure 5:
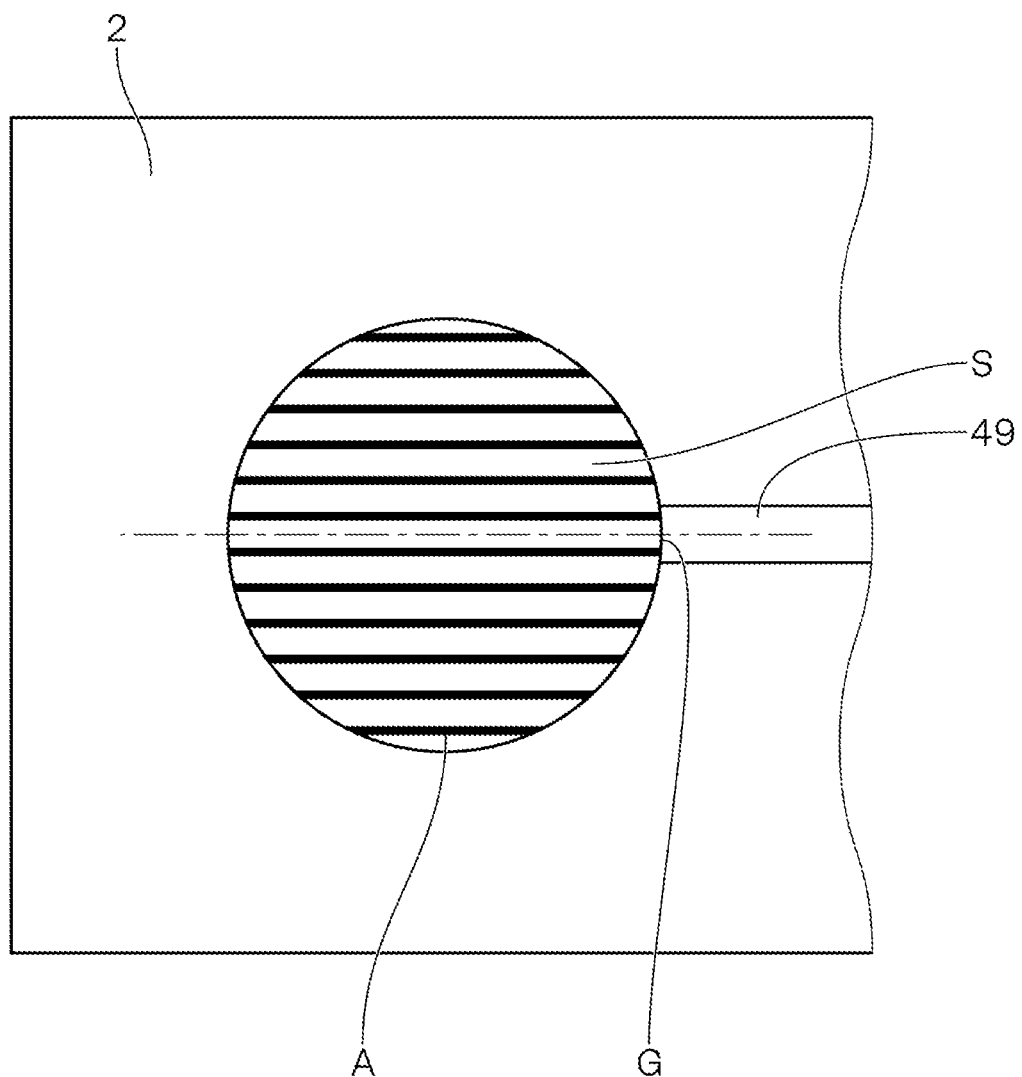
FIG. 5 is an explanatory view of an example of loading a functional sheet to the side of a fixed mold of the mold.

Note that, FIG. 5 is a main schematic view of a parting surface of the fixed mold 2 viewed from the side of the movable mold 1, and exemplarily illustrates the polarizing sheet S loaded to the side of the fixed mold 2. The polarizing axis (the reference axis) A of the polarizing sheet S is schematically indicated with thick lines.

In loading the polarizing sheet S into the mold 50 in this manner, as not particularly illustrated, for example, a positioning tab is at least formed on the periphery of the polarizing sheet S and additionally a notch that engages with the positioning tab is formed on the side of the mold 50, in order to position the polarizing sheet S. The present applicant has previously proposed the positioning of the polarizing sheet S, in Japanese Patent Application No. 2014-067743.

The polarizing plastic lens (the functional plastic lens) manufactured according to the present embodiment, maybe, but is not particularly limited to, a powered lens or a non-powered lens. The lens shape may be any of a spherical surface and an aspherical surface, and any of a single-version lens, a progressive power lens, and a multifocal lens may be provided. Note that, for example, in a case where a lens having directivity in an optical surface shape, such as the progressive power lens or the multifocal lens, is manufactured, there is a need to consider that the polarizing plastic lens that has been manufactured is inserted into a spectacle frame to make the polarizing axis horizontal.

In this case, the molding surface formed on each of the inserts 11 on the side of the movable mold 1 and each of the inserts 12 on the side of the fixed mold 2 in the mold 50, forms the direction of the optical surface shape of the lens to be molded when the molding surface is housed and fixed in the mold 50, to be a direction suitable for the direction of the polarizing axis of the polarizing sheet S loaded in the mold 50.

The single-version lens is preferably selected as the polarizing plastic lens (the functional plastic lens) manufactured according to the present embodiment since the effect of the wrinkle inhibition is more excellently acquired.

According to the present embodiment, the polarizing sheet S to which the bending has been performed to make the curve in the direction, parallel to the reference axis A, in which the accuracy of the bending is high, agree with the curve of the molding surface parallel to a direction corresponding to the reference axis A (note that, approximate agreement in a margin of error, included), is used. With this arrangement, the "wrinkles" being the external appearance defect can be more favorably inhibited from occurring on the lens surface that has been manufactured, but the present embodiment is not limited to this.

In a case where the curve of the polarizing sheet is deeper than the molding surface, the polarizing sheet has the center side in contact with the molding surface when being loaded into the mold. Accordingly, as described above, it is considered that the polarizing sheet is prevented from extending while adhering to the molding surface from the center side toward the outer circumferential side and then the "wrinkles" occurs in a portion that does not extend anymore. In contrast to this, in a case where the curve of the polarizing sheet is smaller and shallower than the curvature of the molding surface, the polarizing sheet has the center side floating on the molding surface when being loaded in the mold. Accordingly, it is considered that the polarizing sheet can deform to agree with the molding surface with the extension not being prevented. Thus, even using the polarizing sheet S to which the bending has been performed to make the curve in the direction parallel to the reference axis A, slightly shallower than the curve of the molding surface parallel to the direction corresponding to the reference axis A, in a range in which the polarizing sheet can deform to agree with the molding surface, can inhibit the occurrence of the "wrinkles". The polarizing sheet S may be commonly used in manufacturing the functional plastic lens having a similar optical surface shape.

Figure 6:
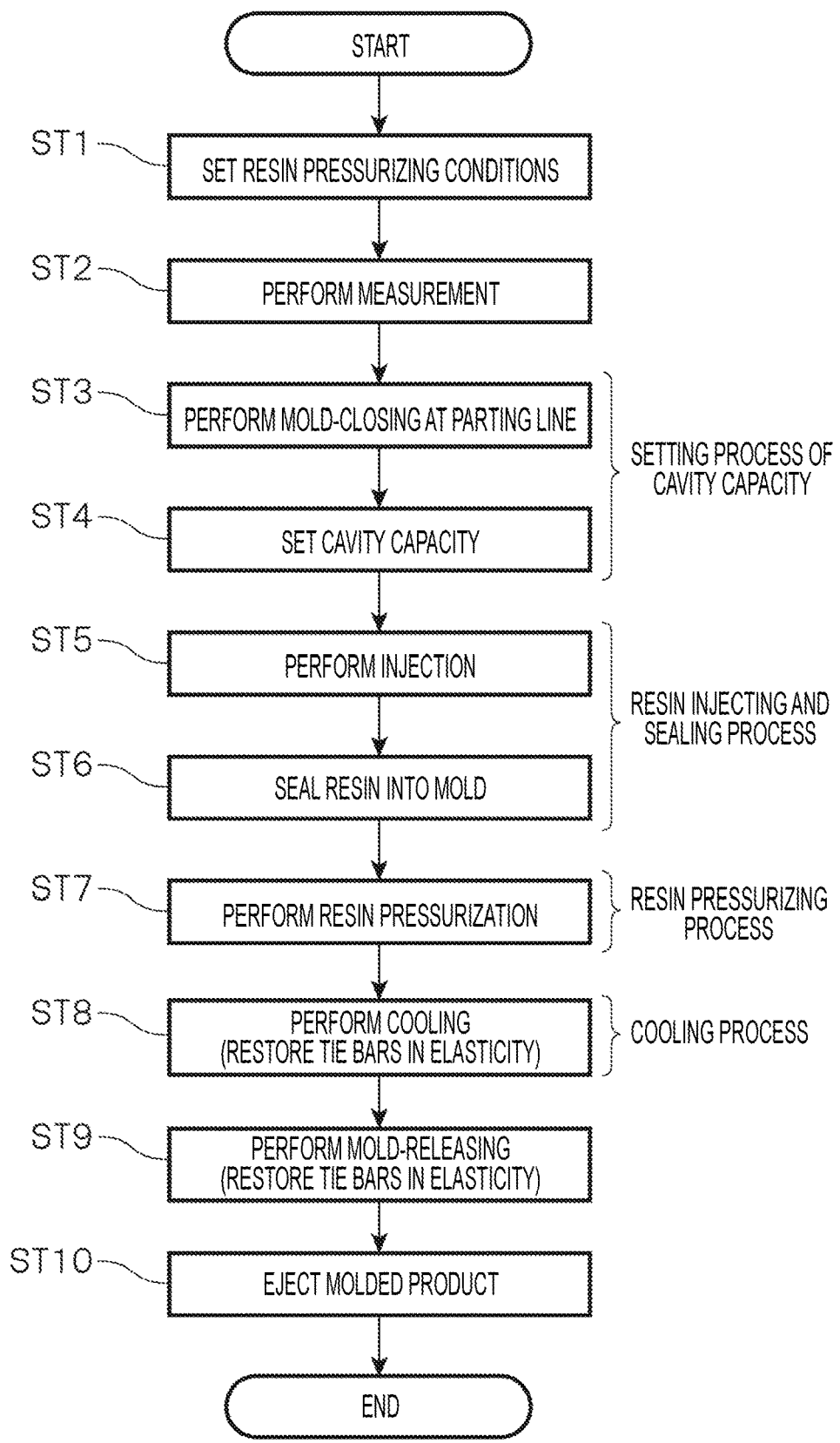
FIG. 6 is a flowchart of steps in a method of manufacturing a polarizing plastic lens according to an embodiment of the present invention.

The method of manufacturing a functional plastic lens according to the present embodiment can be performed, more specifically, by sequentially following steps (ST1 to ST10) in a flowchart illustrated in FIG. 6.

At ST1, setting of resin pressurizing conditions is performed. This is for adjusting mold-clamping force in accordance with the characteristics of the functional plastic lens to be molded (e.g., a lens shape and lens power) in order to previously give appropriate pressure to the resin in each of the cavities 3.

At ST2, measurement is performed. In the injection device 80, the raw resin being pellet-shaped, input from the hopper 81, is sheared and pulverized by the screw rotating inside the heating cylinder 82. Then, the raw resin is sent to the cylinder anterior chamber formed between the tip of the screw and the nozzle 85, so as to be measured, the raw resin being melted and mixed by the shear heat and the heating from the heater included in the heating cylinder 82. Here, a necessary amount of the molten resin is measured to be filled into the cavities 3, the runners 49, and the sprue 48.

Note that, thermoplastic resin, such as polycarbonate resin or methacrylate resin can be typically used as the raw resin for the molding of the plastic lens of this type.

At ST3, the mold-closing is performed to the mold 50 including the functional sheet (the polarizing sheet) S loaded as described above, at the parting line PL. Specifically, the toggle link mechanism 65 drives so that the crosshead 73 moves forward. With this arrangement, the toggle links 71A and 71B extend and the movable die plate 64 moves forward to the fixed die plate 61 so that the mold-closing of the mold 50 is performed. In this case, the mold-closing is performed to the fixed mold 2 and the movable mold 1 at the parting line PL with the gap S being retained in a state where the disc springs 17A interposed between the mold body 4 of the movable mold 1 and the mold mounting member 16 have not been compressed. The gap S is set to have a maximum opening amount, in the state.

At ST4, setting of cavity capacity is performed. The crosshead 73 further moves forward to a previously set position (a cavity capacity setting position) from the state where the movable mold 1 and the fixed mold 2 have been in close contact with each other at the parting line PL at ST3. With this arrangement, the toggle links 71A and 71B extend so that the movable die plate 64 moves toward the fixed die plate 61 and then moves to a cavity expanding position. A cavity expanding amount is determined by the setting of the crosshead position. With this arrangement, the gap S of the mold 50 is reduced with the cavity expanding amount remaining. In this case, the capacity (the thickness) of each of the cavities 3 has expanded to be larger than the capacity (the thickness) of the lens to be molded, namely, the thickness of the ejected molded product. The disc springs 17A are compressed so that a degree of mold-clamping force occurs as the reaction force of the disc springs 17A.

At ST5, injection is performed. The molten resin measured at ST2 is injected into the mold 50 through the channel of the injection nozzle 85. That is, the molten resin measured with the introduction into the heating cylinder 82 of the injection device 80, is injected. After that, the molten resin is injected from the nozzle 85 formed at the tip of the heating cylinder 82, so as to be filled into each of the cavities 3 through the sprue 48, the runner 49, and the gate G. When the molten resin is filled into each of the cavities 3, the speed of the injection is constantly controlled.

At ST6, the resin is sealed into the mold. After the predetermined amount of the resin is injected at T5, the crosshead 73 further moves forward just before the injection and the filling of the molten resin are completed. After the injection and the filling are completed, the nozzle shutting mechanism 90 immediately makes the nozzle shutting pin 91 protrude into the sprue 48 to shut the nozzle 85. With this arrangement, the molten resin that has been filled is sealed into the mold 50 in a state where having been compressed and pressurized.

At ST7, resin pressurization is performed. When the crosshead 73 starts moving forward at ST6 and then the crosshead 73 moves forward to and stops at the origin (a zero position), the toggle links 71A and 71B completely extend so that the molten resin sealed into the mold 51 is compressed and pressurized.

At ST8, cooling is performed. A mold temperature adjusting device 51 performs temperature control of heating/cooling fluid, to make the temperature of each portion (e.g., the inserts and the insert guide members) in the mold 50, a temperature of Tg or less set in accordance with the characteristics of the lens to be molded. When the molten resin sealed in the mold 50 in a state where having been compressed and pressurized, is cooled, the raw resin injected and filled into each of the cavities 3 solidifies and contracts as the cooling progresses in a state where the pressurization and compression has been performed, so that the plastic lens having predetermined capacity is molded.

At ST9, a mold-releasing operation is performed. In the mold-releasing operation, the crosshead 73 of the toggle link mechanism 65 moves backward to the rear plate 62 so that the mold-releasing of the mold 50 is performed.

At ST10, a molded product ejecting operation is performed. When the crosshead 73 completely moves backward, the interval between the movable die plate 64 and the fixed die plate 61 becomes maximum so that the mold 50 is divided at the parting line PL and the mold-releasing is performed. In performing the mold-releasing, the ejecting rods 34 and 38 moves forward so that the polarizing plastic lens that has been molded is ejected.

Figure 7:
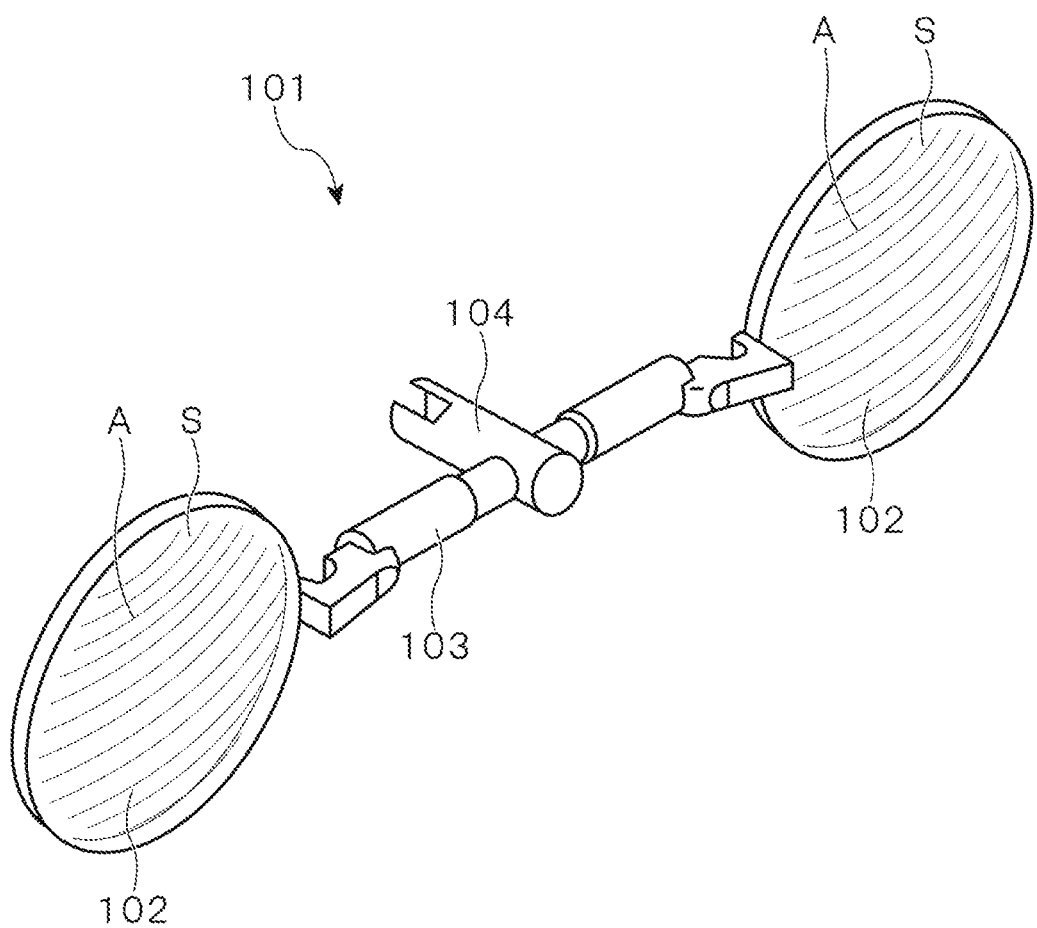
FIG. 7 is an explanatory view of the polarizing plastic lens molded by using the injection molding device in FIG. 1, the polarizing plastic lens being ejected from the mold.

The functional plastic lens molded in this manner is ejected from the mold 50 as a molded product 101 including lens portions 102 formed by the cavities 3, coupling portions 103 molded by the runners 49, and a rod portion 104 molded by the sprue 48, coupled to each other (refer to FIG. 7). After the ejection from the mold 50 is performed, the lens portions 102 are cut off and then necessary post-processing is performed to each of the lens portions 102 to forma completed product. Then, the completed product is provided into market as a functional plastic lens, such as a polarizing plastic lens.

A mark remaining at each of the lens portions 102, due to the cutting off of the coupling portions 103, is typically referred to as a gate mark. For example, the gate mark is often made to be invisible by performance of polishing, but a distortion occurs in the periphery of the gate mark of a lens molded by an injection molding process, the distortion being different from those in other portions. Examining the distortion can specify the position of the gate mark, and a portion including the distortion occurring is also referred to as the gate mark.

The polarizing plastic lens manufactured as the functional plastic lens according to the present embodiment, includes the polarizing axis A of the polarizing sheet S, not orthogonal to a direction facing the center of the gate mark through the center of the lens. For example, the polarizing plastic lens integrally molded with the polarizing sheet S by the insert molding, is inserted into a spectacle frame to make the polarizing axis A of the polarizing sheet S horizontal. Therefore, the gate mark is positioned on the side of a left and right direction in performing the insertion into the spectacle frame, and thus the polarizing plastic lens having the slant of the polarizing axis A to the direction facing the center of the gate mark through the center of the lens, preferably at 45° or less, more preferably at 30° or less, further preferably at 20° or less, particularly preferably at 10° or less, and most preferably at 5° or less, can be said as a polarizing plastic lens having high quality, the polarizing plastic lens having the "wrinkles" being the external appearance defect, inhibited from occurring on the lens surface.

Note that, FIG. 7 schematically illustrates the polarizing axis (the reference axis) A of the polarizing sheet S.

Finally, one embodiment of the present invention will be summarized.

According to the one embodiment of the present invention, in loading, into the mold 50, the functional sheet (e.g., the polarizing sheet) S having a difference in the accuracy of the bending in directions and molding the functional plastic lens (e.g., the polarizing plastic lens) by the insert molding, the direction in which the accuracy of the bending is high to the functional sheet S is made to be the reference axis A and then the functional sheet S is loaded into the mold 50 to inhibit the filling direction of the resin and the reference axis A from being orthogonal to each other. The polarizing plastic lens as the functional plastic lens molded by the insert molding includes the polarizing axis A of the polarizing sheet S not orthogonal to the direction facing the center of the gate mark through the center of the lens.

The present invention has been described with the preferred embodiment, but the present invention is not limited to only the embodiment described above, and thus various alterations may be obviously made in the scope of the present invention.

For example, according to the embodiment described above, the example of manufacturing the polarizing plastic lens with the mold 50 for double-lens acquisition has been given, but single-lens acquisition or multi-lens acquisition, such as triple-lens or more acquisition, may be provided.

The scope of the present invention is given by the scope of the claims instead of the descriptions given above, and includes all alterations in the meaning and the scope of equivalents of the scope of the claims.

The contents of the literature described in this specification and the Japanese application specification of the present application based on priority under the Paris Convention are all incorporated herein.

INDUSTRIAL APPLICABILITY

The present invention can be used as a technique capable of molding a functional plastic lens with high quality by insert molding.

REFERENCE SINGS LIST

50 mold
G gate
S functional sheet (polarizing sheet)
A reference axis (polarizing axis)

The invention claimed is:
1. A method of manufacturing a functional plastic lens, in manufacturing the functional plastic lens by loading a functional sheet having a difference in accuracy of bending in directions, into a mold and by performing insert molding to integrally mold a lens body with the functional sheet, the method comprising:
   making a direction in which the accuracy of the bending of the functional sheet is greatest, a reference axis;
   loading the functional sheet into the mold to inhibit a filling direction of resin and the reference axis from being orthogonal to each other, and
   filling the resin into the mold to integrally mold the lens body with the functional sheet.
2. The method of manufacturing a functional plastic lens according to claim 1, wherein
   the functional sheet is loaded into the mold to make a slant of the reference axis to the filling direction of the resin, at 45° or less.
3. The method of manufacturing a functional plastic lens according to claim 1,
   further comprising bending the functional sheet before the loading step such that the functional sheet has a curvature in a direction along the reference axis which curvature is substantially identical to a curvature on a molding surface of the mold in a direction along which the reference axis of the functional sheet is oriented.
4. The method of manufacturing a functional plastic lens according to claim 1,
   further comprising bending the functional sheet before the loading step such that the functional sheet has a curvature in a direction along the reference axis, which curvature of the functional sheet is greater than a curvature on a molding surface of the mold in a direction along which the reference axis of the functional sheet is oriented.

* * * * *